United States Patent
Shimogawa

(10) Patent No.: US 9,513,945 B2
(45) Date of Patent: Dec. 6, 2016

(54) METHOD FOR CONTROLLING VIRTUAL MACHINE

(71) Applicant: FUJITSU LIMITED, Kawasaki (JP)

(72) Inventor: Kenichirou Shimogawa, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 892 days.

(21) Appl. No.: 13/660,250

(22) Filed: Oct. 25, 2012

(65) Prior Publication Data

US 2013/0185420 A1    Jul. 18, 2013

(30) Foreign Application Priority Data

Jan. 17, 2012    (JP) .................................. 2012-007524

(51) Int. Cl.
| | | |
|---|---|---|
| G06F 15/173 | (2006.01) | |
| G06F 9/455 | (2006.01) | |
| H04L 12/46 | (2006.01) | |
| G06F 9/50 | (2006.01) | |

(52) U.S. Cl.
CPC ......... *G06F 9/45558* (2013.01); *G06F 9/5094* (2013.01); *H04L 12/4645* (2013.01); *G06F 2009/4557* (2013.01)

(58) Field of Classification Search
CPC .... G06F 15/16; G06F 9/45533; G06F 3/0647; G06F 9/5088; G06F 9/5094
USPC .................. 709/224, 221, 223; 718/1; 711/6
See application file for complete search history.

(56) References Cited

U.S. PATENT DOCUMENTS

| | | | | |
|---|---|---|---|---|
| 7,484,208 | B1* | 1/2009 | Nelson ................ | G06F 9/45558 711/6 |
| 2009/0240790 | A1* | 9/2009 | Utsunomiya ....... | H04L 12/4645 709/221 |
| 2010/0287263 | A1* | 11/2010 | Liu ........................ | G06F 9/5088 709/221 |
| 2011/0071876 | A1* | 3/2011 | Fong ...................... | G06Q 10/06 705/7.13 |
| 2011/0282982 | A1* | 11/2011 | Jain ....................... | G06F 9/5094 709/223 |
| 2012/0278807 | A1 | 11/2012 | Nakagawa | |

FOREIGN PATENT DOCUMENTS

| | | |
|---|---|---|
| JP | 2009-282714 | 12/2009 |
| JP | 2011-146002 | 7/2011 |

OTHER PUBLICATIONS

Japanese Office Action mailed Jun. 9, 2015 in related Japanese Application No. 2012-007524.

* cited by examiner

*Primary Examiner* — Kyung H Shin
(74) *Attorney, Agent, or Firm* — Staas & Halsey LLP

(57) ABSTRACT

A first computer starts to copy data of a virtual machine running on the first computer from the first computer to a second computer. The first computer monitors an index value related to conditions of running the virtual machine on the second computer. The first computer causes, based on the index value, the second computer to start operation of the virtual machine based on the data copied from the first computer to the second computer and terminating operation of the virtual machine running on the first computer.

5 Claims, 14 Drawing Sheets

| SERVER NAME | UPS ID |
|---|---|
| host11.abc | UPS1 |
| host12.abc | UPS1 |
| host21.abc | UPS2 |
| host22.abc | UPS2 |
| ⋮ | ⋮ |

FIG. 9

| VIRTUAL MACHINE NAME | CPU RESOURCE | RAM RESOURCE |
|---|---|---|
| VM101 | 4.0 GHz | 16 GB |
| VM102 | 2.0 GHz | 8 GB |
| VM103 | 1.5 GHz | 4 GB |

FIG. 10

| VIRTUAL MACHINE NAME | DESTINATION SERVER |
|---|---|
| VM101 | host21.abc |
| VM102 | host22.abc |
| VM103 | host22.abc |

METHOD FOR CONTROLLING VIRTUAL MACHINE

CROSS-REFERENCE TO RELATED APPLICATION

This application is based upon and claims the benefit of priority of the prior Japanese Patent Application No. 2012-007524, filed on Jan. 17, 2012, the entire contents of which are incorporated herein by reference.

FIELD

The embodiments discussed herein are related to a method for controlling a virtual machine.

BACKGROUND

Virtualization technologies are currently used for running one or more virtual computers (also called virtual machines (VMs)) on a physical computer. Virtual machines are able to execute an operating system (OS) and application software independently from other virtual machines.

Virtualization software to control a virtual machine is executed on a physical computer. The virtualization software includes items called a hypervisor, management OS, and a management domain. The virtualization software, for example, allocates resources such as processing capacity of a central processing unit (CPU) and memory capacity of a random access memory (RAM) included in a computer to a virtual machine. The OS of each virtual machine controls the application software so that the application software is executed within the scope of the resources allocated to each virtual machine.

In an information processing system that includes a plurality of computers, a virtual machine may be migrated between computers. Migration methods of virtual machines include a method called live migration in which a virtual machine may be migrated without shutting down the OS or application software that is being executed at that time. Information processing between computers may be continued in live migration since the virtualization software copies data (programs may also be included) related to the migrated virtual machine from the memory of the source computer to the memory of the destination computer.

A computer system has been proposed in which, when a power source failure is detected in a certain server connected to an uninterruptible power supply (UPS), the virtual machine running on the certain server is migrated to a failover destination server previously associated with the certain server, and the certain server in which the power failure was detected is shut down.

Japanese Laid-open Patent Publication No. 2009-282714 discloses a related technology.

SUMMARY

According to an aspect of the present invention, provided is a method for controlling a virtual machine. The method is executed by a first computer. The first computer starts to copy data of a virtual machine running on the first computer from the first computer to a second computer. The first computer monitors an index value related to conditions of running the virtual machine on the second computer. The first computer causes, based on the index value, the second computer to start operation of the virtual machine based on the data copied from the first computer to the second computer and terminating operation of the virtual machine running on the first computer.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 illustrates an example of a blackout report sent from a server to a management server;

FIG. 10 illustrates an example of a migration report sent from a management server to a server;

DESCRIPTION OF EMBODIMENTS

In an information processing system in which virtual machines are migrated between computers when a certain condition is detected, there is a risk that the migration of the virtual machine may be wasteful if the conditions change after the certain condition is detected. For example, when a virtual machine is migrated upon detection of a blackout in a computer, if the computer is connected to a UPS and the blackout is resolved in a short time (e.g., several seconds to several tens of seconds), the migration accordingly would be wasteful. Moreover, when, for example, a virtual machine is migrated on ahead upon prediction that the load of a computer becomes very large, the migration may accordingly be wasteful if the prediction is incorrect.

Hereinbelow, embodiments will be described with reference to the drawings.

First Embodiment

Figure 1:
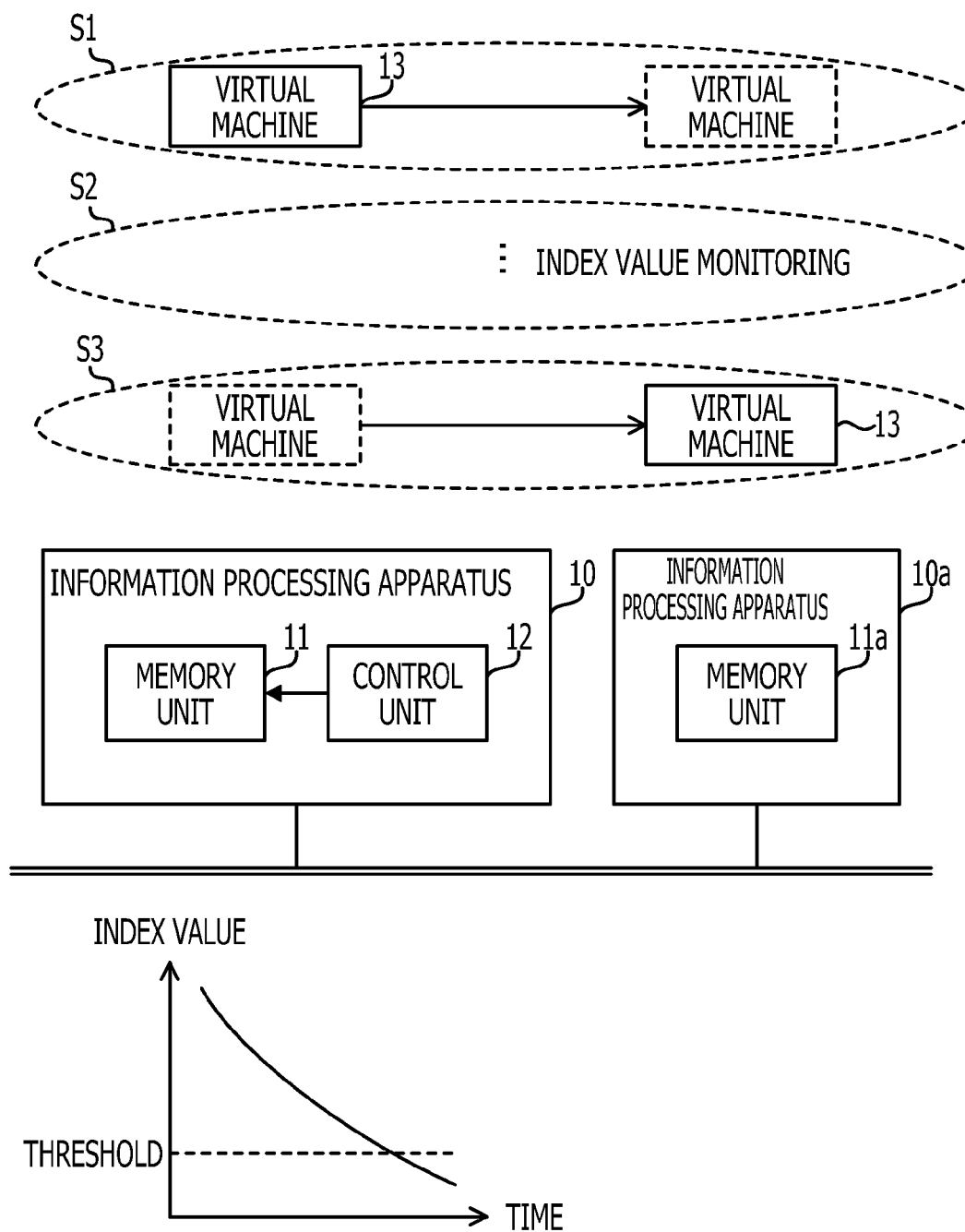
FIG. 1 illustrates an information processing system according to a first embodiment.

FIG. 1 illustrates an information processing system according to a first embodiment. The information processing system according to the first embodiment includes information processing apparatuses 10 and 10a that are computers or the like.

The information processing apparatus 10 includes a memory unit 11 and a control unit 12. The information processing apparatus 10a includes a memory unit 11a. The memory units 11 and 11a are, for example, RAM units. The control unit 12 includes, for example, a processor such as a CPU. The information processing apparatus 10 is connected with the information processing apparatus 10a by a network. A virtual machine 13 may run on the information processing apparatuses 10 and 10a. According to the first embodiment, it is assumed that the virtual machine 13 first runs on the information processing apparatus 10 and then migrated to the information processing apparatus 10a.

Upon detecting a certain trigger event related to the migration of the virtual machine 13, the control unit 12 starts preparation for the migration the virtual machine 13 from the information processing apparatus 10 to the information processing apparatus 10a (S1). The trigger event related to the migration may include, for example, detection of a blackout in a UPS connected to the information processing apparatus 10, or prediction that the load of the information processing apparatus 10 will become very large after a certain amount of time. Starting the preparation for migration includes starting processing to copy data associated with the virtual machine 13 running on the information processing apparatus 10 from the memory unit 11 of the information processing apparatus 10 to the memory unit 11a of the information processing apparatus 10a. For example, the control unit 12 requests the information processing apparatus 10a to accept the virtual machine 13 and secures the resources of the migration destination. The control unit 12 then starts copying the data associated with the virtual machine 13. The data associated with the virtual machine 13 may include data and programs used during information processing being conducted on the virtual machine 13.

The control unit 12 monitors changes in an index value that provides an indication of running the virtual machine 13 on the information processing apparatus 10a, and maintains a state in which the virtual machine 13 is prepared for migration (S2). For example, the index value may be a value that indicates the amount of remaining power of the UPS (e.g., amount of power, a charging ratio, time remaining in which supply is available, etc.), and the control unit 12 waits until the value indicating the amount of remaining power falls below a threshold (e.g., a value corresponding to power required for conducting the migration). Moreover, the index value may be, for example, a value (e.g., a CPU utilization rate, a RAM utilization rate, or the like) that indicates the load on the information processing apparatus 10, and the control unit 12 waits until the value indicating the load rises above a threshold (e.g., a load predicted beforehand). The control unit 12 may continue processing of the preparation while monitoring the changes in the index value. For example, the control unit 12 may reflect the updating of the data associated with the virtual machine 13 in the information processing apparatus 10a by copying a difference from the data previously copied from the memory unit 11 to the memory unit 11a.

The control unit 12 suspends conducting the migration of the virtual machine 13 until the index value reaches the threshold, or until the migration of the virtual machine 13 is canceled as described below. Upon detecting that the index value has reached the threshold, the control unit 12 conducts the migration of the virtual machine 13 (S3). Conducting the migration of the virtual machine 13 includes starting the operation of the virtual machine 13 on the information processing apparatus 10a on the basis of the data copied from the memory unit 11 to the memory unit 11a, and then terminating the operation of virtual machine 13 on the information processing apparatus 10. The termination of the operation of the virtual machine 13 on the information processing apparatus 10 and the starting of the operation of the virtual machine 13 on the information processing apparatus 10a may be conducted in either order or may be conducted concurrently. The termination of the operation of the virtual machine 13 on the information processing apparatus 10 is, for example, an abrupt termination without a procedure to shut down the OS, and may be called "suspension" or "deletion" of the virtual machine. The start of the operation of the virtual machine 13 on the information processing apparatus 10a is, for example, an abrupt start without a procedure to activate the OS, and may be called "resume".

Meanwhile, when the control unit 12 determines that the index value does not reach the threshold, the control unit 12 may cancel the migration of the virtual machine 13. For example, when the blackout is resolved (recovered) and the drop in the amount of remaining power in the UPS is stopped, or when the load of the information processing apparatus 10 does not reach the threshold after a certain amount of time has passed contrary to the prediction, the control unit 12 may determine that the cause for migration of the virtual machine 13 has been resolved. Canceling the migration involves terminating the copying of the data associated with the virtual machine 13 from the memory unit 11 to the memory unit 11a. For example, the control unit 12 instructs the information processing apparatus 10a to release the resources secured in the migration destination and to delete the data copied into the memory unit 11a.

The above-mentioned processing in the information processing apparatus 10 maybe realized by storing a program for controlling the virtual machine 13 in a memory such as a RAM and executing the program by the processor. Additionally, at least a portion of the processing in the above-mentioned information processing apparatus 10 may be implemented through the use of an integrated circuit such as an application specific integrated circuit (ASIC) or a field programmable gate array (FPGA). The processor may include a dedicated processing circuit in addition to a general-use computing circuit for executing program commands.

In the information processing system according to the first embodiment, the migration of the virtual machine 13 is not conducted immediately after a certain trigger event associated with the migration of the virtual machine 13 is detected; but rather the copying of the data of the virtual machine 13 is started and then the processing waits until the index value reaches the threshold. By suspending the execution of the migration when considering the possibility of the cause of the migration of the virtual machine 13 being resolved thereafter, the risk that the migration of the virtual machine 13 is wasteful may be reduced. Moreover, since preparation for the migration is already being conducted, the timing to determine whether to conduct the migration may be delayed as much as possible and the migration of the virtual machine 13 may be conducted quickly after the decision is made.

A system according to a second embodiment described below migrates a virtual machine when a blackout occurs.

Second Embodiment

The second embodiment will be described below. The information processing system according to the second embodiment conducts control so that, when a blackout is detected in a computer connected to a UPS, the virtual machine running on that computer is migrated to another computer before the UPS battery is exhausted. At this time, there is a possibility that a computer that is suffering from the blackout in the same way as the source computer may be selected as the destination computer when the selection is based simply on the amount of free resources in each computer. Moreover, when using a method in which the destination for the virtual machine during a blackout is set on ahead for each computer, there is a problem in that an administrator changes the settings every time the computer configuration of the information processing system is modified and thus the load on administration of the information processing system becomes large. Accordingly, the information processing system according to the second embodiment automatically gathers information that indicates the connection relationships of the computers and the UPSs to determine the destination of a virtual machine.

Figure 2:
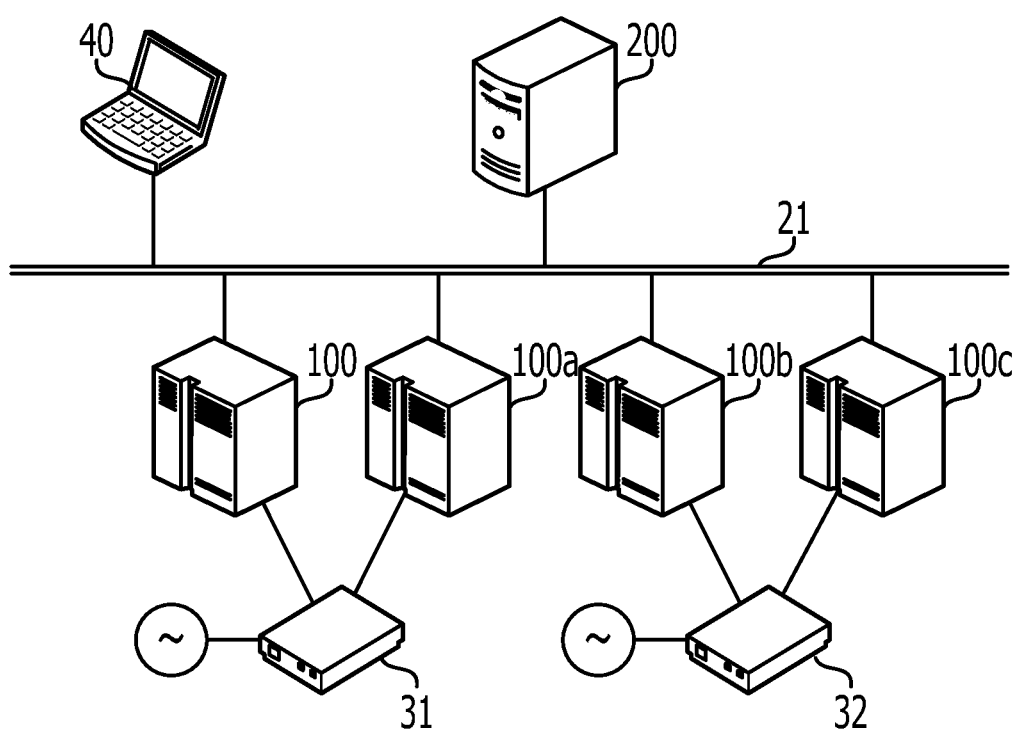
FIG. 2 illustrates an information processing system according to a second embodiment.

FIG. 2 illustrates an information processing system according to the second embodiment. The information processing system according to the second embodiment includes UPSs 31 and 32, a client 40, servers 100, 100a, 100b, and 100c, and a management server 200. The client 40, the servers 100, 100a, 100b, and 100c, and the management server 200 are connected to a network 21. The server 100 is an example of the information processing apparatus 10 according to the first embodiment, and the server 100b is an example of the information processing apparatus 10a according to the first embodiment.

The UPSs 31 and 32 are connected to an electrical power line through a plug. The UPSs 31 and 32 each include a battery as an auxiliary power source. When electrical power is being supplied through the electrical power line (when not in a blackout), the UPSs 31 and 32 each charge the battery and supply electrical power to servers connected thereto without using the battery's electrical power. Conversely, when the supply of electrical power from the electrical power line is stopped (during a blackout), the UPSs 31 and 32 supply electrical power to the servers connected thereto by discharging electrical power from the respective batteries. The amount of time in which the electrical power discharged from the batteries may be supplied is, for example, several minutes or normally no more than thirty minutes. The UPS 31 is connected to the servers 100 and 100a, and the UPS 32 is connected to the servers 100b and 100c.

The client 40 is a computer that is a terminal device operated by a user. The client 40 requests activation of a virtual machine to the management server 200 (or another management server) and causes the activated virtual machine to conduct required information processing.

The servers 100, 100a, 100b, and 100c are server computers each of which allows a plurality of virtual machines to run. The servers 100, 100a, 100b, and 100c activate, under the control of the management server 200, virtual machines requested by the client 40 and other clients. Data (which may include programs) used in activating the virtual machine may be stored in a non-volatile storage device included in each server, or may be stored in a file server (not illustrated) that is connected to the network 21 and may be accessed by the servers.

The servers 100, 100a, 100b, and 100c obtain information indicating conditions of supplying electrical power from the UPS connected thereto. When a blackout is detected, the servers 100, 100a, 100b, and 100c control migration of virtual machines in collaboration with the management server 200. In the migration of a virtual machine, data associated with the virtual machine is moved from a certain server to a different server so that the information processing by the virtual machine is restarted in the destination server. The live migration, which allows migration without shutting down the OS or application software that is being executed at that time, is conducted to migrate a virtual machine. Due to the live migration, a period of time in which the information processing by the virtual machine is substantially terminated may be reduced.

The management server 200 is a server computer that manages the virtual machines running on the servers 100, 100a, 100b, and 100c. The management server 200 allocates virtual machines requested by the client 40 and other clients to the servers 100, 100a, 100b, and 100c in accordance with the loads of the plurality of servers. Furthermore, when a blackout is detected in a certain server, the management server 200 searches for another server in which the blackout is not detected and controls the migration of a running virtual machine between the servers so that the virtual machine does not shut down.

The information processing system according to the second embodiment may be achieved as a system (for example, a so-called client system) that uses a data center. In this case, for example, the client 40 accesses the network 21 through a broad network such as the Internet and the like. Further, the servers 100 and 100a and the UPS 31, and the servers 100b and 100c and the UPS 32 may be installed in different sites. In this case, the network 21 may include, for example, a plurality of networks. The plurality of networks may be combined as one virtual network using virtualization technology such as a virtual local area network (VLAN) or a virtual private network (VPN). Moreover, a plurality of management servers 200 may be established (for example, a management server may be installed in each site).

Figure 3:
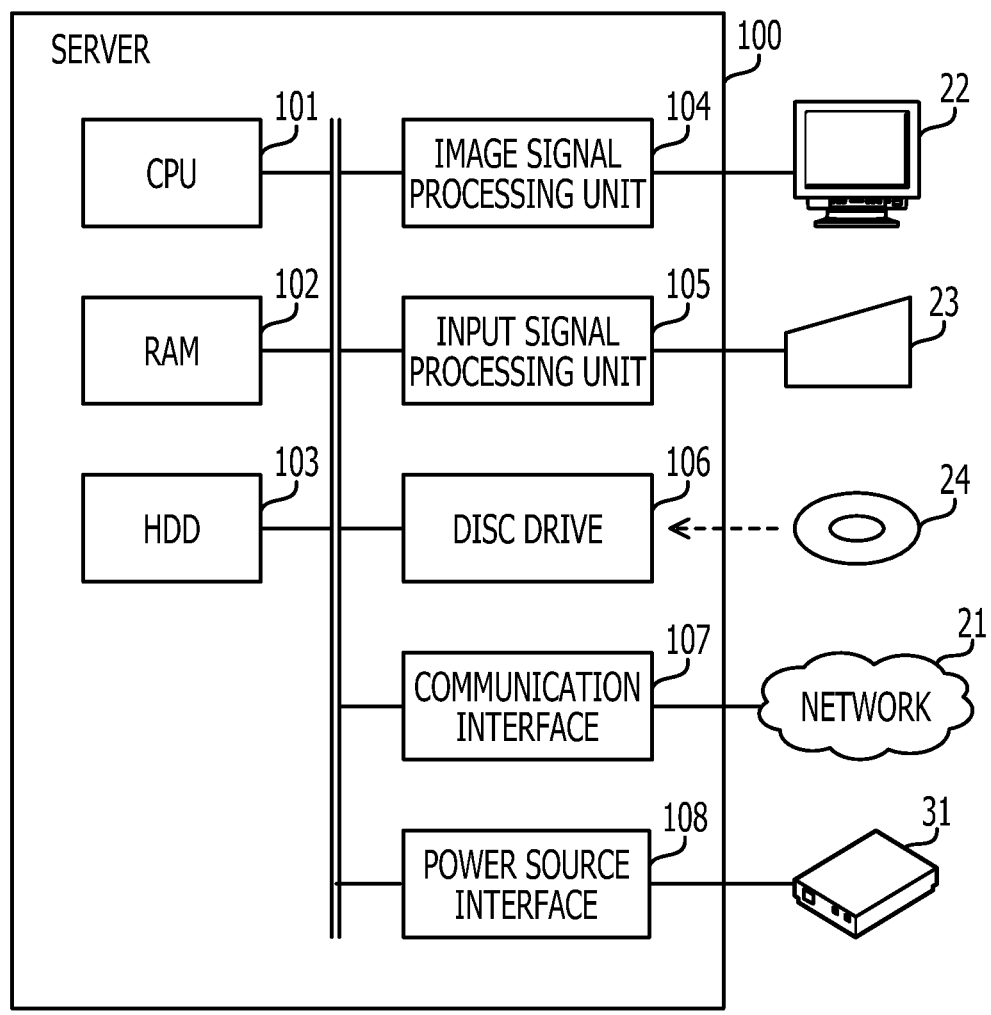
FIG. 3 is a diagram illustrating an example of a hardware configuration of a server.

FIG. 3 is a diagram illustrating an example of a hardware configuration of a server. The server 100 includes a CPU 101, a RAM 102, a hard disc drive (HDD) 103, an image signal processing unit 104, an input signal processing unit 105, a disc drive 106, a communication interface 107, and a power source interface 108. The above-described units are connected to a bus. The client 40, the servers 100a, 100b, 100c, and the management server 200 may be realized by similar hardware. The CPU 101 is an example of the control unit 12 according to the first embodiment, and the RAM 102 is an example of the memory unit 11 according to the first embodiment.

The CPU 101 is a processor that includes a computing circuit that executes program commands. The CPU 101 reads at least a portion of the programs and data stored in the HDD 103 to load into the RAM 102 and the loaded programs. A portion of the computing capacity of the CPU 101 is allocated, for example, to the virtual machines as CPU resources. The server 100 may include a plurality of processors and may run a plurality of virtual machines concurrently.

The RAM 102 is a volatile memory that temporarily stores programs executed by the CPU 101 and data used in the information processing. A portion of the memory capacity of the RAM 102 is allocated, for example, to each virtual machine as memory resources. The server 100 may include types of memories other than a RAM, and may include a plurality of memories.

The HDD 103 is a non-volatile storage device that stores data and programs such as OS programs and application programs. The HDD 103 reads (writes) data from (to) a built-in magnetic disc in accordance with commands from the CPU 101. A portion of the storage region of the HDD 103 is allocated, for example, to each virtual machine as a virtual disc. The server 100 may include types of non-volatile storage devices other than an HDD, e.g., a solid state drive (SSD), and may include a plurality of storage devices.

The image signal processing unit 104 outputs an image to a display unit 22 connected to the server 100 in accordance with a command from the CPU 101. A cathode ray tube (CRT) display or a liquid crystal display may be used, for example, as the display unit 22.

The input signal processing unit 105 obtains input signals from an input device 23 connected to the server 100 and outputs the input signals to the CPU 101. A keyboard or a pointing device such as a mouse or a touch panel, for example, may be used as the input device 23.

The disc drive 106 is a drive device for reading data and programs stored on a recording medium 24. For example, a magnetic disc such as a flexible disc (FD) or an HDD, an optical disc such as a compact disc (CD) or a digital versatile disc (DVD), or a magneto-optical disc (MO) may be used as the recording medium 24. The disc drive 106, for example, stores, in the RAM 102 or the HDD 103, data and programs read from the recording medium 24 in accordance with a command from the CPU 101.

The communication interface 107 is an interface that is able to conduct communication with the servers 100a, 100b, 100c, and the management server 200 through the network 21. The communication interface 107 may be a wired interface or a wireless interface.

The power source interface 108 is an interface that is able to connect to at least one UPS. The UPS 31 is connected to the power source interface 108 of the server 100. The power source interface 108 obtains information indicating conditions of supplying electrical power from the UPS 31 and stores the information in the RAM 102. An interface that receives the electrical power supply from the UPS 31 and an interface that conducts data communication with the UPS 31 may be separate interfaces or may be integrated as one interface. The power source interface 108 may include a generic data communication interface such as a universal serial bus (USB) interface or the like as an interface for conducting data communication with the UPS 31.

Figure 4:
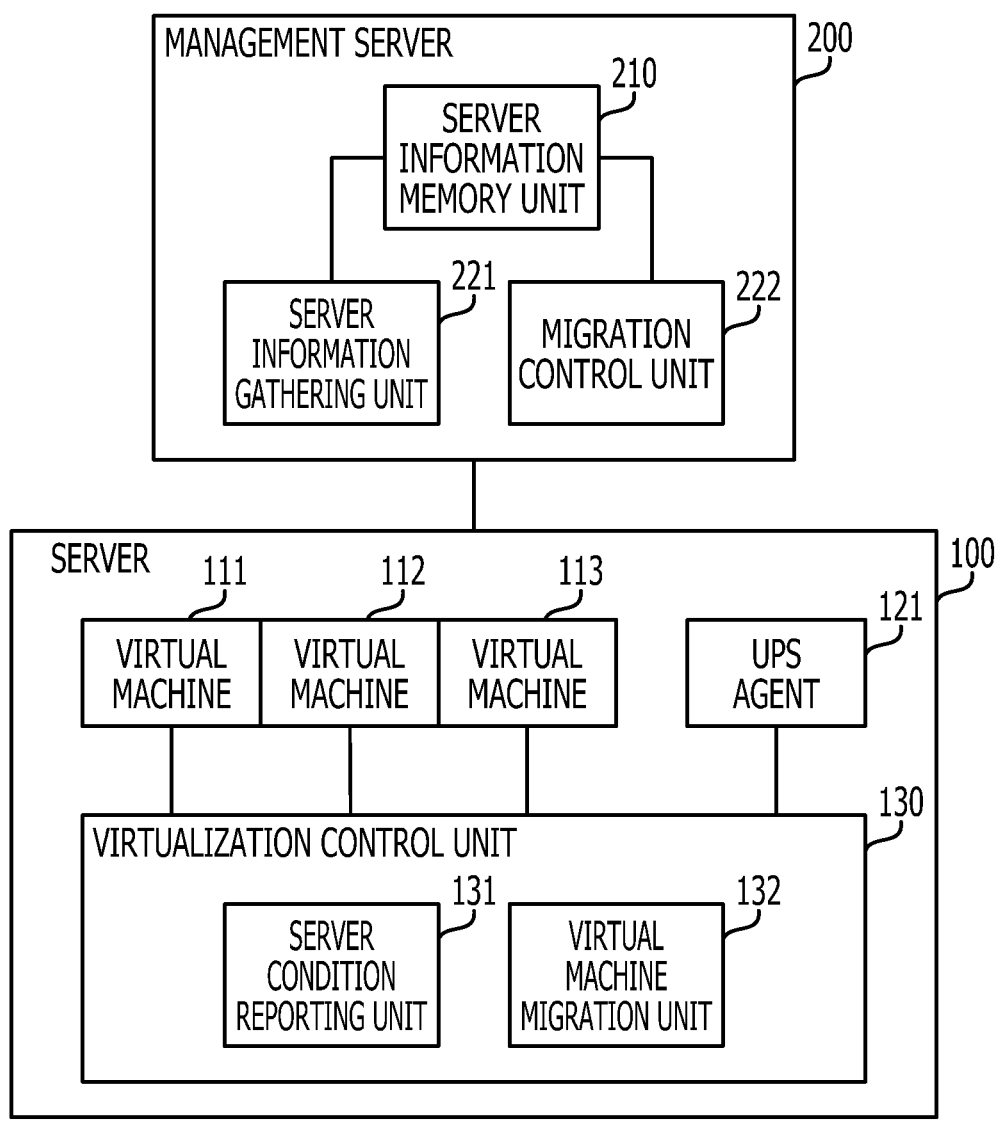
FIG. 4 is a diagram illustrating an example of a functional configuration of a server and a management server.

FIG. 4 is a diagram illustrating an example of a functional configuration of a server and a management server.

The server 100 includes virtual machines 111, 112, 113, a UPS agent 121, and a virtualization control unit 130. The above-mentioned units may be realized, for example, by executing program modules stored in the RAM 102 by the CPU 101.

The virtual machines 111, 112, and 113 are virtual computers that conduct information processing requested by the client 40 and other clients. OS and application software are executed on the virtual machines. The OS of each virtual machine manages resources allocated by the virtualization control unit 130 and controls the application software. The resources include computing capacity of the CPU 101, storage regions of the RAM 102, virtual discs that are storage regions of the HDD 103, and channels of interfaces connected to peripheral devices.

The UPS agent 121 obtains information indicating conditions of supplying electrical power from the UPS 31, and reports the conditions of supplying electrical power to the virtualization control unit 130. For example, the UPS agent 121 reports the conditions to the virtualization control unit 130 when a blackout in the UPS 31 is detected and when a resolution of the blackout (power return) in the UPS 31 is detected. Additionally, the UPS agent 121 obtains information (e.g., charged capacity, charging ratio, or the like) on the remaining battery capacity from the UPS 31 during a blackout, calculates the remaining operating time from the amount of change per unit of time of the remaining battery capacity, and reports the calculated result to the virtualization control unit 130. Alternately, the UPS 31 may calculate the remaining operating time. The UPS agent 121 may periodically query the UPS 31 about the information indicating conditions of supplying electrical power, or the UPS 31 may report the information indicating conditions of supplying electrical power regularly or irregularly by interruption.

The virtualization control unit 130 controls the virtual machines 111, 112, and 113 running on the server 100. The virtualization control unit 130 may be a hypervisor, a management OS, a management domain, or the like. The virtualization control unit 130 allocates resources of the server 100 to the virtual machines 111, 112, and 113 so as to avoid competition among the resources. The amount of resources allocated to the virtual machines may vary in accordance with an agreement with the user requesting the activation of the virtual machine. CPU resources are divided, for example, as units of clock frequencies (Hz), and RAM resources are divided, for example, as units of storage capacity (bytes).

The virtualization control unit 130 controls migration of the virtual machines 111, 112, and 113 in accordance with the conditions of supplying electrical power reported by the UPS agent 121. The virtualization control unit 130 may periodically query the UPS agent 121 about the conditions of supplying electrical power, or the UPS agent 121 may report the conditions of supplying electrical power regularly or irregularly by interruption. The virtualization control unit 130 includes a server condition reporting unit 131 and a virtual machine migration unit 132.

The server condition reporting unit 131 checks a server name of the server 100 and an identifier (ID) of the UPS 31 connected to the server 100 in response to a request from the management server 200, and reports the result of the checks to the management server 200. The ID of the UPS 31 may be checked, for example, by querying the UPS agent 121. Further, the server condition reporting unit 131 reports the amount of free resources (e.g., the amount of unused CPU resources and RAM resources) of the server 100 to the management server 200 in response to a request from the management server 200. Furthermore, when a blackout is reported by the UPS agent 121, the server condition reporting unit 131 checks the amount of resources used by the running virtual machines 111, 112, and 113, and reports the amount of resources along with the report of the blackout to the management server 200.

When a blackout is detected by the UPS 31, the virtual machine migration unit 132 controls migration of the virtual machines 111, 112, and 113 running on the server 100 to another server in accordance with an instruction from the management server 200. The migration of the virtual machines is performed using live migration. The virtual machine migration unit 132 requests the destination server specified by the management server 200 to secure resources. Before terminating the running virtual machines 111, 112, and 113, the virtual machine migration unit 132 copies the data (which may include programs) associated with the virtual machines 111, 112, and 113 from the RAM 102 of the server 100 to the RAM of the destination server. The virtual machine migration unit 132 then instructs the destination server to start operation of the virtual machines, and deletes the virtual machines 111, 112, and 113 from the server 100.

However, after the blackout is detected and the destination server is reported from the management server 200, the virtual machine migration unit 132 does not immediately complete the migration of the virtual machines 111, 112, and 113, but prepares the migration and waits. In preparing the migration, the virtual machine migration unit 132 secures resources in the destination server and starts copying the data on the RAM 102. The virtual machine migration unit 132 monitors the conditions of supplying electrical power while in the state in which the migration is prepared, waits for the remaining battery capacity of the UPS 31 to become low (for example, the remaining operating time is reduced to a period of time required for completing the migration of the virtual machines 111, 112, and 113), and then completes the migration. However, if the return of power is detected by the UPS 31 before the remaining battery capacity becomes low, the virtual machine migration unit 132 cancels the prepared migration of the virtual machines 111, 112, and 113.

The management server 200 includes a server information memory unit 210, a server information gathering unit 221, and a migration control unit 222. The server information memory unit 210 may be realized, for example, as a secured storage region on a RAM or an HDD. The server information gathering unit 221 and the migration control unit 222 may be realized by executing program modules by a CPU.

The server information memory unit 210 stores therein server information gathered from the servers 100, 100a, 100b, and 100c. The server information includes a server name for identifying each server associated with an ID of the UPS connected to that server. The server name may be a fully qualified domain name (FQDN) that includes a domain name and a host name, or may be server identification information, for example, an address such as an internet protocol (IP) address.

The server information gathering unit 221 queries the servers 100, 100a, 100b, and 100c about the IDs of the UPSs and stores the server names and UPS IDs reported by the servers in the server information memory unit 210 as the server information. Querying about UPS IDs is preferably carried out continuously since the connection relationship between the servers and the UPSs may change.

When a blackout is reported from any of the servers, the migration control unit 222 refers to the server information stored in the server information memory unit 210 to search for another server that may not be affected by the blackout. A server connected to the same UPS as the server that reported the blackout is determined to be affected by the blackout and is excluded from the search subjects. The migration control unit 222 queries the searched servers about free resources and selects a destination server that is able to accommodate the virtual machine running on the server that reported the blackout in order to specify the destination server. If there is a plurality of virtual machines, the destination servers may be different between the virtual machines.

Figure 5:
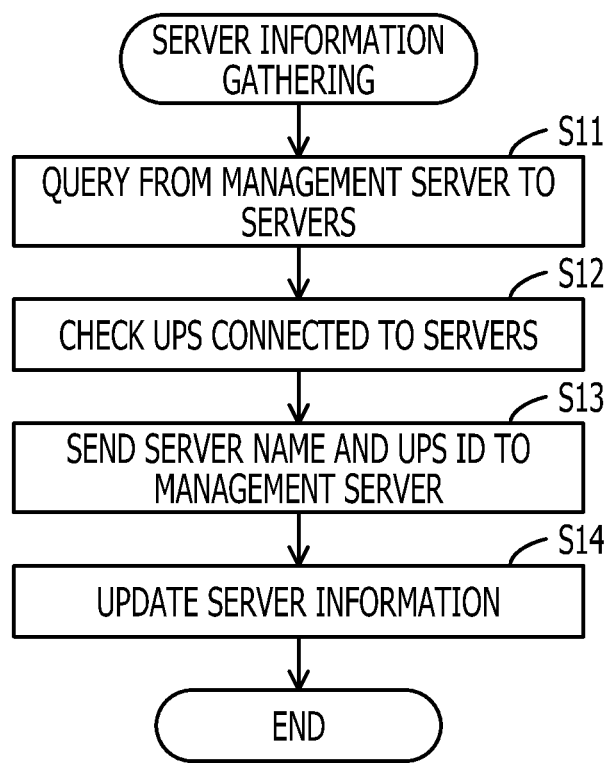
FIG. 5 is a flowchart illustrating an example of a procedure for gathering server information.

FIG. 5 is a flowchart illustrating an example of a procedure for gathering server information. The procedure for gathering server information illustrated in FIG. 5 is conducted, for example, before a blackout is detected in any server.

(S11) The server information gathering unit 221 of the management server 200 queries the servers 100, 100a, 100b, and 100c about UPS IDs.

(S12) The server condition reporting unit 131 of the server 100 checks the server name of the server 100 and the ID of the UPS connected to the server 100. For example, the server condition reporting unit 131 obtains the ID of the UPS 31 from the UPS agent 121. The servers 100a, 100b, and 100c check the server names and the UPS IDs in the same way as the server 100.

(S13) The server condition reporting unit 131 of the server 100 sends the server name and the UPS ID checked in S12 to the management server 200. The servers 100a, 100b, and 100c send the server names and the UPS IDs to the management server 200 in the same way as the server 100.

(S14) The server information gathering unit 221 of the management server 200 associates the UPS IDs with the server names obtained from the servers 100, 100a, 100b, and 100c and registers the associated server names and the UPS IDs in the server information memory unit 210 as the server information. Server information previously registered in the server information memory unit 210 is updated with the latest UPS IDs.

Figure 6:
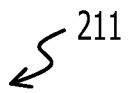
FIG. 6 illustrates an example of a server information table.

FIG. 6 illustrates an example of a server information table. By conducting the procedure illustrated in FIG. 5, a server information table 211 as illustrated in FIG. 6 is stored in the server information memory unit 210 of the management server 200. A record of the server information table 211 includes a field for a server name and a field for a UPS ID. Information that identifies each server is registered in the server name field. Information that identifies each UPS is registered in the UPS ID field.

In FIG. 6, "host11.abc" indicates the server 100, "host12.abc" indicates the server 100a, "host21.abc" indicates the server 100b, and "host22.abc" indicates the server 100c. Furthermore, "UPS1" indicates the UPS 31 and "UPS2" indicates the UPS 32. Since the servers 100 and 100a are connected to the same UPS, the servers 100 and 100a are associated with the same UPS ID. Since the servers 100b and 100c are connected to the same UPS, the servers 100b and 100c are associated with the same UPS ID.

Figure 7:
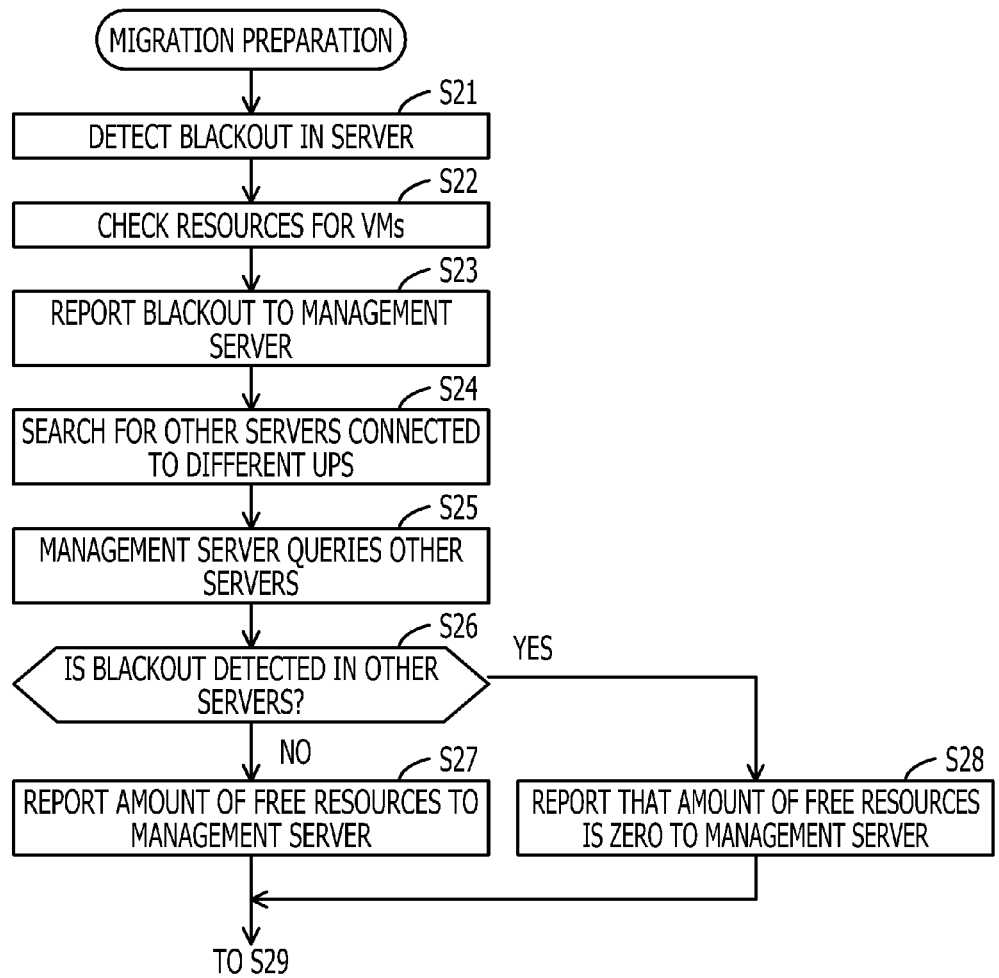
FIG. 7 is a flowchart illustrating an example of a procedure of preparation for migration.
Figure 8:
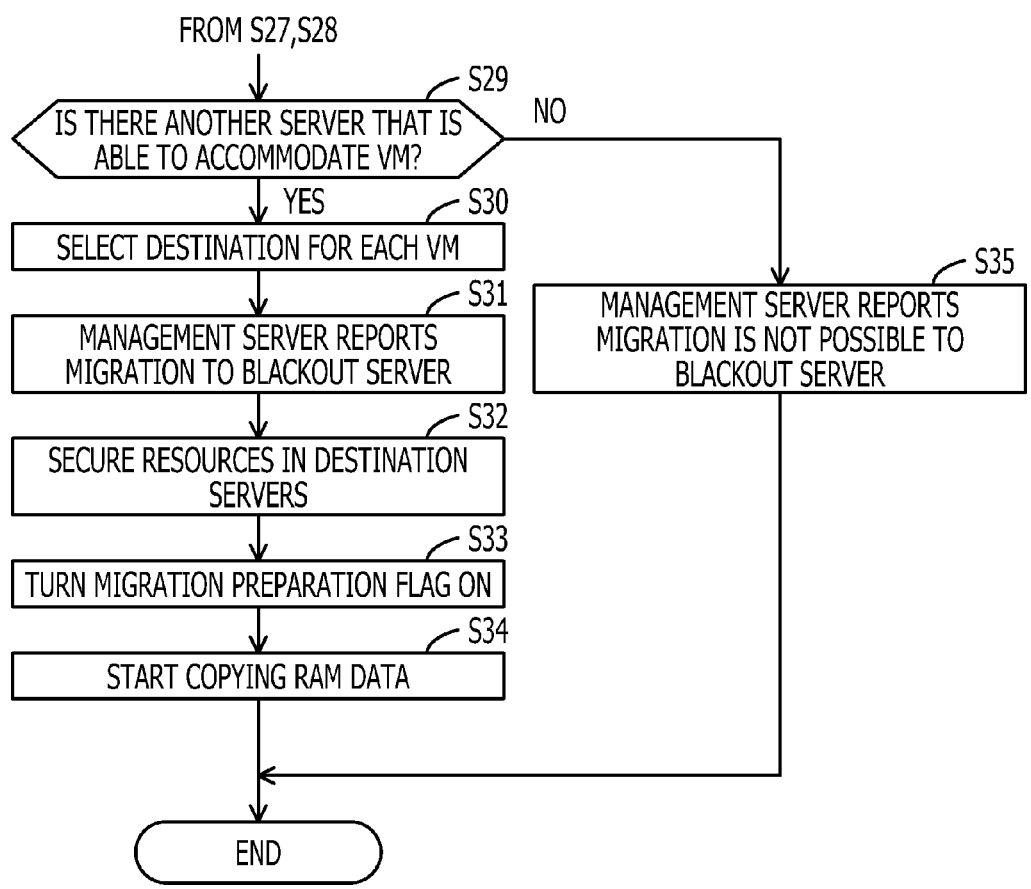
FIG. 8 is a flowchart illustrating an example of a procedure of preparation for migration.

FIGS. 7 and 8 are flowcharts illustrating an example of a procedure of preparation for migration. Here it is assumed that the UPS 31 connected to the server 100 detects that the electrical power supply from the electrical power line has stopped.

(S21) The UPS agent 121 of the server 100 receives a blackout report from the UPS 31 and then reports the blackout to the virtualization control unit 130.

(S22) The server condition reporting unit 131 of the server 100 checks the amount of resources (e.g., amounts of CPU resources and RAM resources) being used by each of the virtual machines 111, 112, and 113 running on the server 100.

(S23) The server condition reporting unit 131 of the server 100 sends to the management server 200 a blackout report that includes the server name and the amount of resources checked in S22.

(S24) The migration control unit 222 of the management server 200 searches the server information table 211 stored in the server information memory unit 210 for servers connected to UPSs different from the UPS connected to the server 100. In the exemplary system in FIG. 2, the server 100a connected to the UPS 31 is excluded and the servers 100b and 100c connected to the UPS 32 are found. If a blackout report is received from a certain server before receiving the blackout report from the server 100, the migration control unit 222 may exclude the certain server and a server connected to the same UPS as the UPS connected to the certain server.

(S25) The migration control unit 222 of the management server 200 queries the servers found in S24 about the amount of free resources (e.g., amounts of unused CPU resources and unused RAM resources). It is assumed here that the migration control unit 222 queries at least the server 100b.

(S26) A server condition reporting unit of the server 100b determines whether the server 100b has also detected a blackout. When a blackout has been detected, the processing advances to S28. When a blackout has not been detected, the processing advances to S27. Other servers that receive queries in S25 also check for the presence of detected blackouts in the same way as the server 100b.

(S27) The server condition reporting unit of the server 100b reports the amount of free resources (e.g., the amounts of unused CPU resources and unused RAM resources) to the management server 200.

(S28) The server condition reporting unit of the server 100b reports that the amount of free resources is zero to the management server 200. Consequently, the server 100b is not selected as the migration destination of the virtual machines 111, 112, and 113. Alternatively, the server 100b may report that a blackout has been detected to the management server 200. The other servers that receive queries in S25 also reply in S27 or S28 in the same way as the server 100b.

(S29) The migration control unit 222 of the management server 200 determines whether there is a server that is able to accommodate at least one of the virtual machines 111, 112, and 113, based on the amount of resources used by the virtual machines 111, 112, and 113 and on the amount of free resources in the servers found in S24. When at least one virtual machine may be accommodated, the processing advances to S30. When none of the virtual machines may be accommodated, the processing advances to S35.

(S30) The migration control unit 222 of the management server 200 selects a migration destination for each of the virtual machines 111, 112, and 113 from the servers that have more free resources than the amount of resources used by each of the virtual machines. For example, the migration control unit 222 selects a server that has more free CPU resources than the amount of CPU resources being used and that has more free RAM resources than the amount of RAM resources being used. The virtual machines 111, 112, and 113 may all be migrated to the same server or may be separately migrated to a plurality of servers. Selecting a destination server is preferably carried out so that the loads of the servers after the migration become as uniform as possible.

(S31) The migration control unit 222 of the management server 200 sends a migration report to the server 100 that sent the blackout report. The migration report includes information (e.g., the server names of the destination servers) that indicates the destination servers selected in S30 for each of the virtual machines. Migration destinations may not be specified for some of the virtual machines due to a lack of resources.

(S32) The virtual machine migration unit 132 of the server 100 requests the destination servers specified by the management server 200 to secure resources corresponding to the amount of resources being used by the virtual machines to be migrated to the destination servers. The servers that receive the requests reserve CPU resources and RAM resources for accommodating the virtual machines to be migrated.

(S33) The virtual machine migration unit 132 of the server 100 turns ON a migration preparation flag that indicates that migration preparation for the virtual machines is underway in the server 100. The migration preparation flag is stored, for example, as control information in the RAM 102.

(S34) The virtual machine migration unit 132 of the server 100 starts processing to copy the data stored in the RAM 102 to the RAM of the destination server for the respective virtual machines 111, 112, and 113. The virtual machines 111, 112, and 113 are not terminated at this time and the data on the RAM 102 may be updated. Thus, the copying of the data on the RAM 102 is conducted continuously (e.g., periodically) until the migration is completed or canceled.

(S35) The migration control unit 222 of the management server 200 reports to the server 100, which has sent the blackout report, that the migration of the virtual machines 111, 112, and 113 is not conducted. In this case, the virtualization control unit 130 of the server 100 shuts down the OSs of the virtual machines 111, 112, and 113 when the remaining battery capacity of the UPS 31 becomes low.

FIG. 9 illustrates an example of a blackout report sent from a server to a management server. The blackout report illustrated in FIG. 9 is sent from the server 100 to the management server 200 in the above-mentioned S23. The blackout report includes, for each virtual machine, information that indicates a virtual machine name, the utilization amount of CPU resources, and the utilization amount of RAM resources. The virtual machine name is identification information uniquely assigned to each virtual machine. The utilization amount of CPU resources is represented, for example, by a clock frequency. The utilization amount of RAM resources is represented, for example, by the number of bytes of a storage region.

In FIG. 9, "VM101" indicates the virtual machine 111, "VM102" indicates the virtual machine 112, and "VM103" indicates the virtual machine 113. For example, the virtual machine 111 is using 4 GHz of CPU resources and 16 GB of RAM resources.

FIG. 10 illustrates an example of a migration report sent from a management server to a server. The migration report illustrated in FIG. 10 is sent in S31 from the management server 200 to the server 100. The migration report includes, for each virtual machine, a virtual machine name and information that indicates a destination server. The destination server is represented, for example, with a server name such as an FQDN. In FIG. 10, the server 100b is specified as the destination server for the virtual machine 111, and the server 100c is specified as the destination server for the virtual machines 112 and 113.

Figure 11:
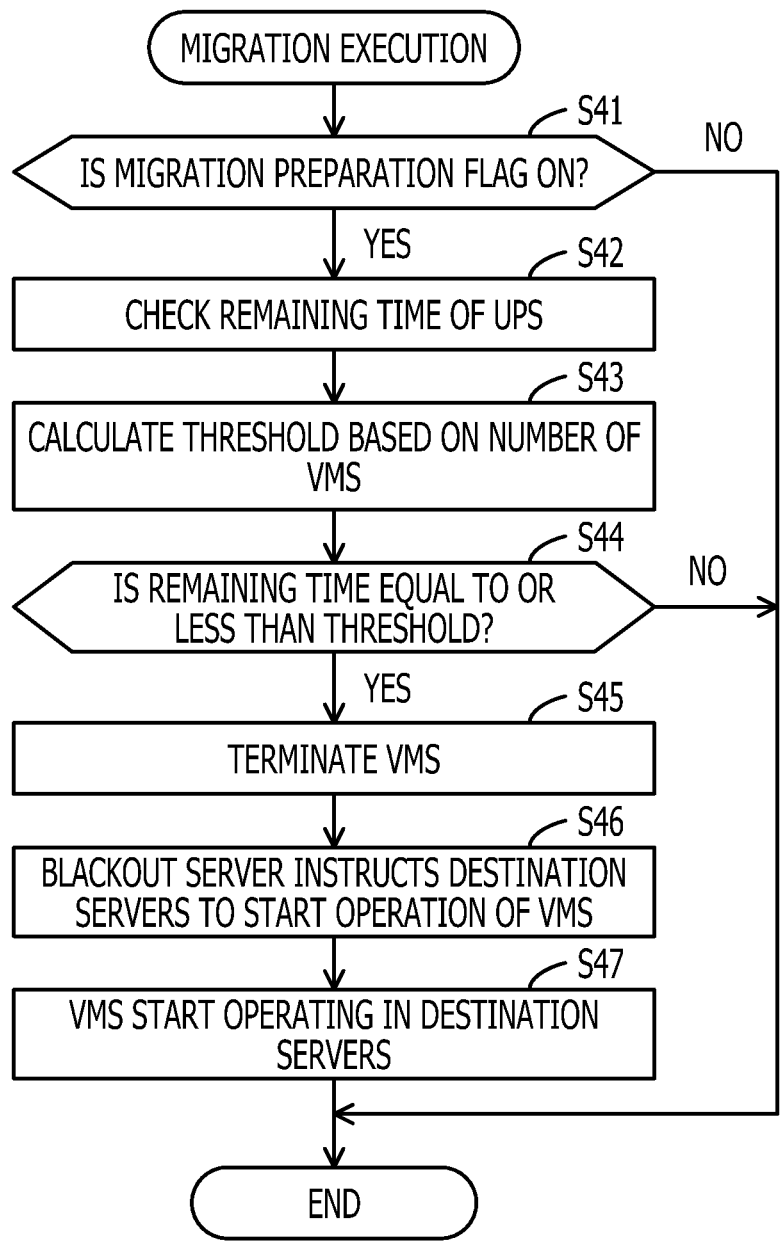
FIG. 11 is a flowchart illustrating an example of a procedure for conducting migration.

FIG. 11 is a flowchart illustrating an example of a procedure for conducting migration. The procedure illustrated in FIG. 11 is conducted continuously (e.g., periodically) in the servers 100, 100a, 100b, and 100c. Here, the procedure conducted in the server 100 is considered.

(S41) The virtual machine migration unit 132 of the server 100 determines whether the migration preparation flag is ON, or specifically whether the migration preparation for the virtual machines is underway. When the migration preparation flag is ON, the processing advances to S42. When the migration preparation flag is OFF, the processing is terminated.

(S42) The virtual machine migration unit 132 of the server 100 obtains from the UPS agent 121 information that indicates the remaining operating time provided by the battery of the UPS 31. The remaining operating time may be calculated by the UPS agent 121, or may be calculated by the UPS 31.

(S43) The virtual machine migration unit 132 of the server 100 checks the number of virtual machines running on the server 100 and to be migrated. The virtual machine migration unit 132 calculates a threshold of the operating time based on the number of virtual machines. The threshold is preferably a period of time required to secure for migration of the virtual machines. For example, the virtual machine migration unit 132 previously saves information that indicates the period of time taken for completing the migration of one virtual machine, and establishes a value that represents the number of virtual machines multiplied by the required time per one virtual machine as the threshold. For example, the number of virtual machines to be migrated is three as illustrated in FIG. 4.

(S44) The virtual machine migration unit 132 of the server 100 determines whether the remaining operating time checked in S42 is equal to or less than the threshold calculated in S43. When the remaining operating time is not more than the threshold, the processing advances to S45; otherwise the processing is terminated. Although the migration execution is determined in S42 to S44 based on the remaining operating time provided by the battery, the migration execution may be determined based on the charged capacity or the charging ratio of the battery. In that case, the virtual machine migration unit 132 calculates a threshold regarding the charged capacity or the charging ratio.

(S45) The virtual machine migration unit 132 of the server 100 determines to conduct the migration prepared for the virtual machines 111, 112, and 113. The virtual machine migration unit 132 terminates the virtual machines 111, 112, and 113 running on the server 100 and copies a portion of the data on the RAM 102, which is updated after the previous copy, to the destination server.

(S46) The virtual machine migration unit 132 of the server 100 instructs the destination server to start the operation of the virtual machines according to the copied data. The operation instruction may include the virtual machine names of the virtual machines prepared for migration. For example, the virtual machine migration unit 132 instructs the server 100b to start the operation of the virtual machine 111, and instructs the server 100c to start the operation of the virtual machines 112 and 113.

(S47) The virtualization control units of the destination servers (e.g., servers 100b and 100c) receive the instruction from the server 100 and start the operation of the migrated virtual machines. Consequently, the migration of the virtual machines 111, 112, and 113 is completed.

Figure 12:
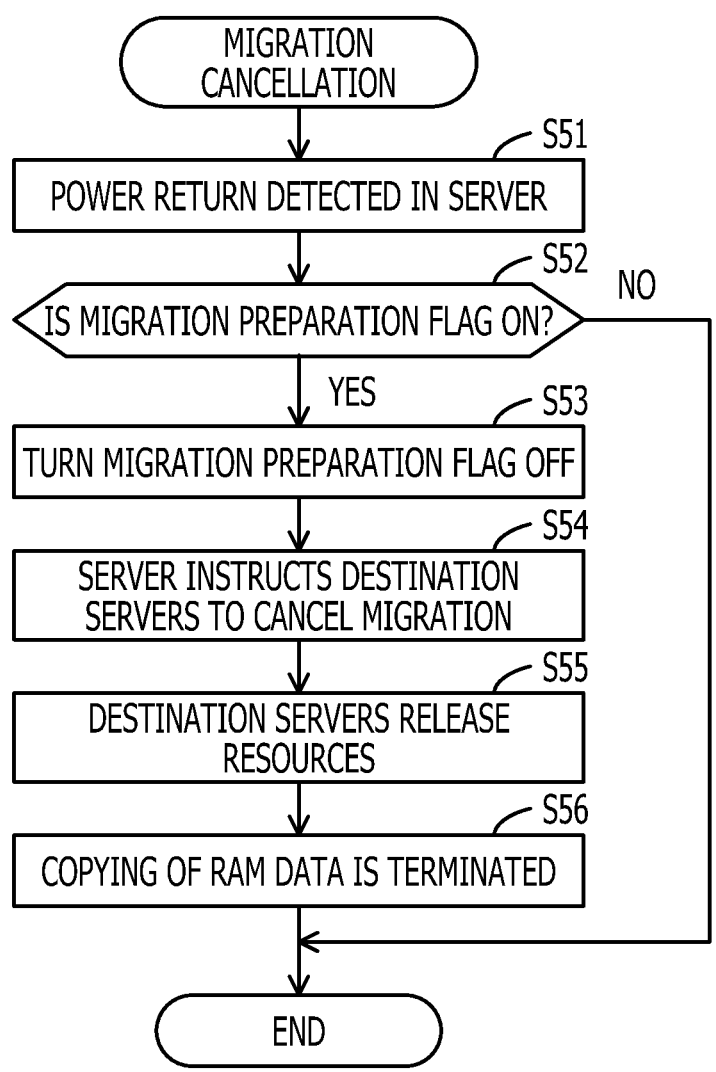
FIG. 12 is a flowchart illustrating an example of a procedure of cancellation for migration.

FIG. 12 is a flowchart illustrating an example of a procedure of cancellation for migration. The procedure illustrated in FIG. 12 is conducted when a power return is detected while waiting for the remaining operating time to reach or fall below the threshold as described in FIG. 11. Here, the procedure conducted in the server 100 is considered.

(S51) The UPS agent 121 of the server 100 receives a power return report from the UPS 31 and then reports the power return to the virtualization control unit 130.

(S52) The virtual machine migration unit 132 of the server 100 determines whether the migration preparation flag is ON, or specifically whether the migration preparation for the virtual machines is underway. When the migration preparation flag is ON, the processing advances to S53. When the migration preparation flag is OFF, the processing is terminated.

(S53) The virtual machine migration unit 132 of the server 100 turns the migration preparation flag OFF. As described above, the migration preparation flag is stored, for example, in the RAM 102.

(S54) The virtual machine migration unit 132 of the server 100 instructs the destination server specified by the management server 200 to cancel the prepared migration of the virtual machines. The cancellation instruction includes the virtual machine names of the virtual machines prepared for migration. For example, the virtual machine migration unit 132 instructs the server 100b to cancel the migration of the virtual machine 111, and instructs the server 100c to cancel the migration of the virtual machines 112 and 113.

(S55) The virtualization control units of the servers specified as destinations (e.g., servers 100b and 100c) receive the instructions from the server 100 and release the resources (e.g., CPU resources and RAM resources) allocated to the virtual machines scheduled for migration. Consequently, the data copied from the server 100 is deleted.

(S56) The virtual machine migration unit 132 of the server 100 terminates the copying of the data associated with the virtual machines 111, 112, and 113. Consequently, the virtual machines 111, 112, and 113 are not migrated to other servers and the operation on the server 100 is continued.

Figure 13:
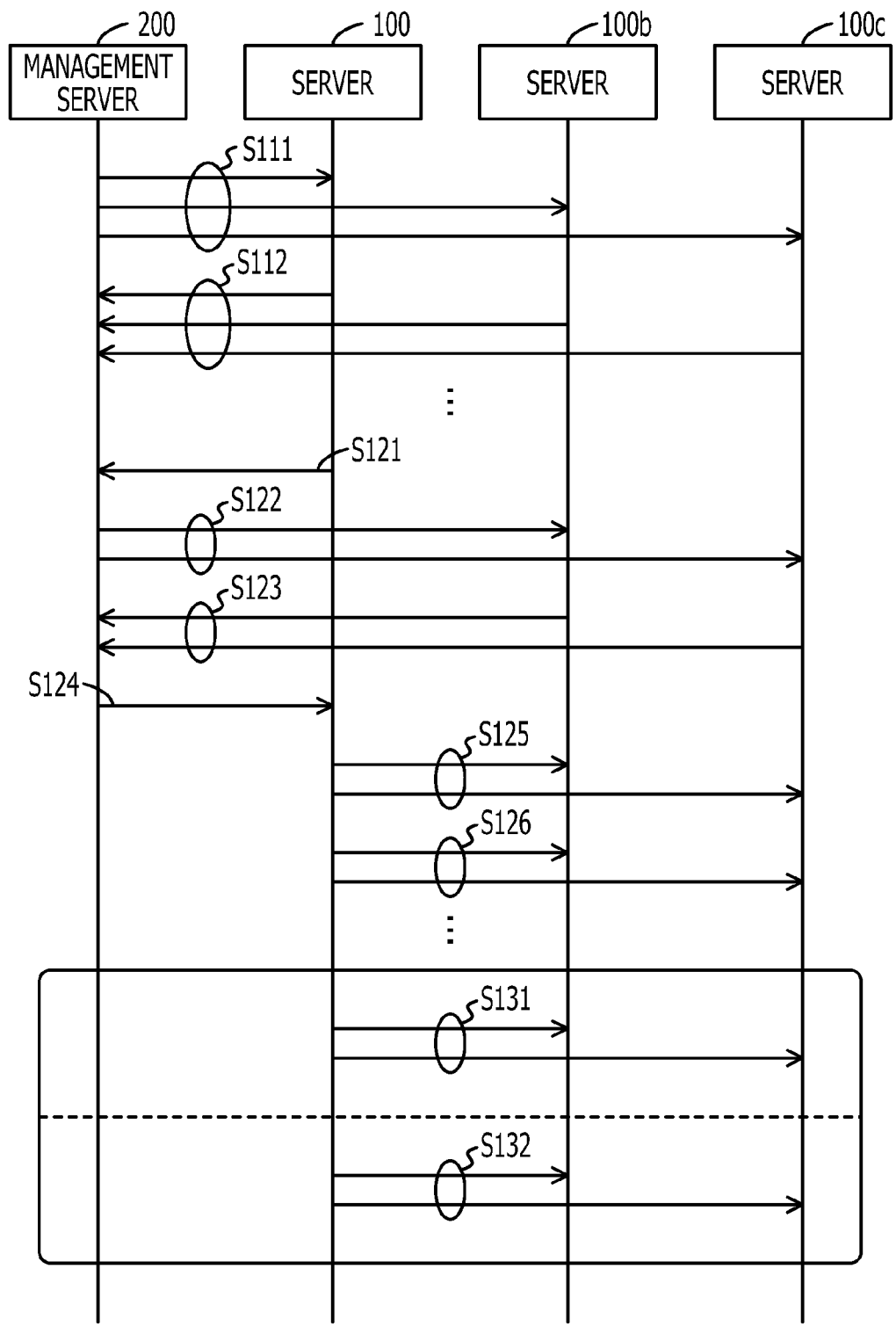
FIG. 13 is a sequence diagram illustrating an example of communication between a management server and a plurality of servers.

FIG. 13 is a sequence diagram illustrating an example of communication between a management server and a plurality of servers. A case is considered in which a blackout is detected in the UPS 31, the server 100b is selected as the destination of the virtual machine 111, and the server 100c is selected as the destination of the virtual machines 112 and 113.

The management server 200 queries the servers 100, 100a, 100b, and 100c about the ID of the UPS connected to each of the servers 100, 100a, 100b, and 100c (S111). The servers 100, 100a, 100b, and 100c send the respective server names and the UPS IDs to the management server 200 (S112). As a result, the information indicating the connection relationships between the servers and the UPSs is registered in the server information table 211 provided in the management server 200.

The server 100 sends a blackout report to the management server 200 when the occurrence of a blackout in the UPS 31 is detected (S121). The blackout report includes information indicating the amount of resources being used by the virtual machines 111, 112, and 113. The management server 200 searches the server information table 211 and finds the servers 100b and 100c as destination candidates of the virtual machines indicated in the blackout report. The server 100a connected to the same UPS as the UPS connected to the server 100 that sent the blackout report is excluded from the candidates. The management server 200 queries the found servers 100b and 100c about the amount of free resources (S122). The servers 100b and 100c send the current amount of free resources to the management server 200 (S123).

The management server 200 determines that the server 100b is the destination of the virtual machine 111 and the server 100c is the destination of the virtual machines 112 and 113 based on the amount of resources being used by the virtual machines 111, 112, and 113 and on the amount of free resources in the servers 100b and 100c. The management server 200 sends the migration report that indicates the destination servers for the virtual machines to the server 100 (S124). The server 100 sends a request for resources for the virtual machine 111 to the server 100b, and sends a request for resources for the virtual machines 112 and 113 to the server 100c (S125). The server 100 starts to copy the data associated with the virtual machine 111 to the server 100b, and starts to copy the data associated with the virtual machines 112 and 113 to the server 100c (S126). The server 100 then waits until the remaining operating time provided by the battery of the UPS 31 reaches the threshold.

When the server 100 detects that the remaining operating time reaches or falls below the threshold, the server 100 instructs the server 100b to start the operation of the virtual machine 111, and instructs the server 100c to start the operation of the virtual machines 112 and 113 (S131). Consequently, the migration of the virtual machines 111, 112, and 113 is completed. Conversely, when a power return is detected in the UPS 31 before the remaining operating time reaches the threshold, the server 100 instructs the server 100b to cancel the migration of the virtual machine 111, and instructs the server 100c to cancel the migration of the virtual machines 112 and 113 (S132). Consequently, the migration of the virtual machines 111, 112, and 113 is canceled. S131 and S132 are selectively conducted in FIG. 13.

Figure 14:
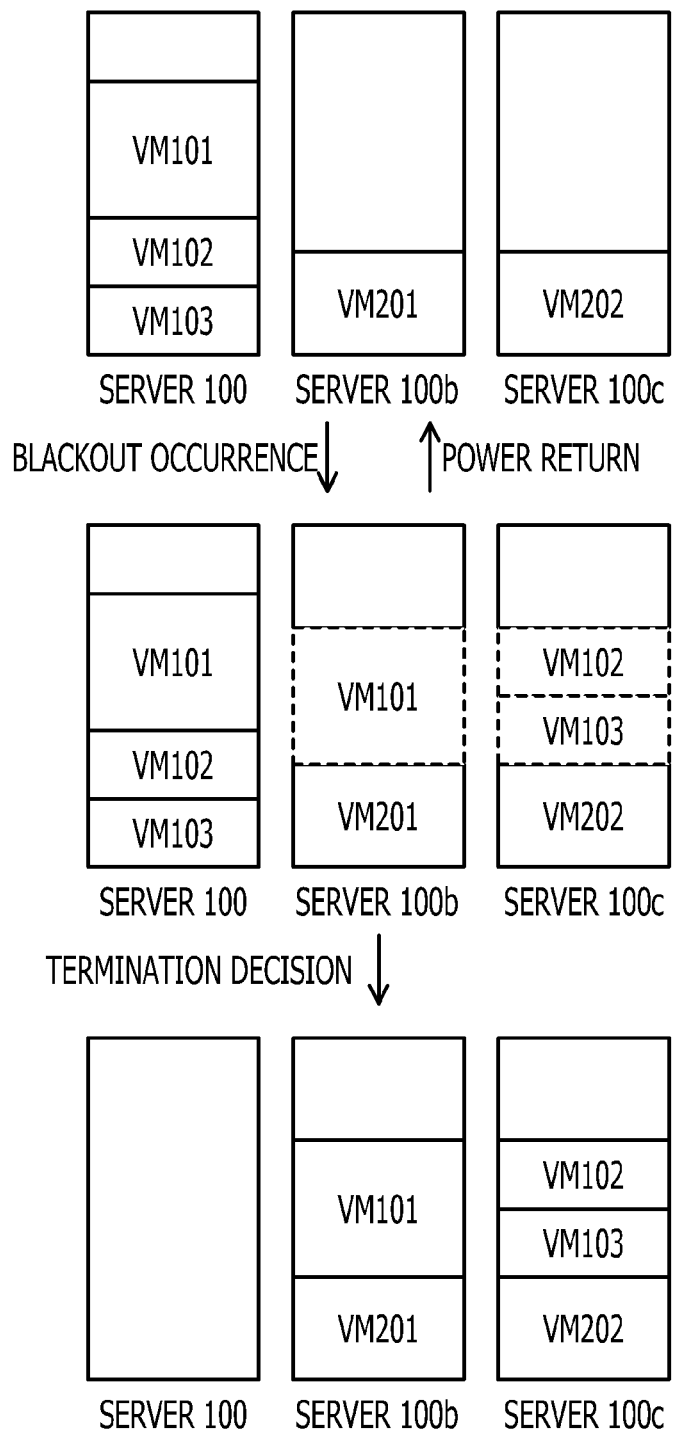
FIG. 14 illustrates examples of changes in resource usage.

FIG. 14 illustrates examples of changes in resource usage. Before the occurrence of a blackout, the virtual machines 111, 112, and 113 (VM101, VM102, and VM103, respectively) are running on the server 100. Moreover, other virtual machines (VM201, VM202) are running on the servers 100b and 100c, respectively.

When a blackout is detected in the server 100, preparation for migrating the virtual machine 111 to the server 100b is conducted. At this time, resources for the virtual machine 111 in the server 100b are secured and the contents of the RAM are copied between the server 100 and the server 100b while the virtual machine 111 continues to run on the server 100. Further, preparation for migrating the virtual machines 112 and 113 to the server 100c is conducted. At this time, resources for the virtual machines 112 and 113 in the server 100c are secured and the contents of the RAM are copied between the server 100 and the server 100c while the virtual machines 112 and 113 continue to run on the server 100.

When the remaining operating time in the server 100 is detected to be at or below the threshold, the migration of the virtual machine 111 to the prepared server 100b is conducted. As a result, the resources for the virtual machine 111 are released in the server 100 and the virtual machine 111 runs on the server 100b. Further, the migration of the virtual machines 112 and 113 to the prepared server 100c is conducted. As a result, the resources for the virtual machines 112 and 113 are released in the server 100 and the virtual machines 112 and 113 run on the server 100c. The loads in the servers 100b and 100c after the migration are preferably as uniform as possible. When a power return is detected in the server 100 on the other hand, the copying of the RAM contents is terminated and the conditions are returned to the state before the detection of the blackout.

In the information processing system according to the second embodiment, information indicating the connection relationships between the servers and the UPSs is gathered, and when the occurrence of a blackout in a certain server is detected, another server that is connected to a UPS that is different from the one connected to the certain server may be automatically found. Consequently, the migration of a virtual machine at the occurrence of a blackout may be automated and changes in the connection relationships between servers and UPSs may be handled with flexibility without separately specifying a virtual machine evacuation server for each server.

Further, when the occurrence of a blackout is detected in a certain server, the migration of the virtual machine is not conducted immediately. Instead, the migration is conducted after waiting until the remaining battery capacity of the UPS has become low after the preparation for the migration is completed. Consequently, the risk of wastefully conducting the migration of a virtual machine due to a short blackout period (e.g., several seconds or several tens of seconds) may be reduced. Further, the decision to conduct the migration may be delayed and the migration may be conducted quickly after the decision to migrate is made since preparation for the migration is being conducted.

Although the second embodiment describes an example of migration of the virtual machine upon the occurrence of a blackout, the method for delaying the migration of the virtual machine may also be applied to the migration of the virtual machine upon the occurrence of another phenomenon. For example, a period of high load may be predicted from data that indicates past changes in load of a server, and preparation to migrate a virtual machine to another server may be conducted in advance before the period in which the load is predicted to be high arrives. Thus, the load of the server may be monitored and the migration of the prepared virtual machine may be conducted if the load meets or exceeds a threshold. Conversely, the migration of the prepared virtual machine may be canceled if the load does not meet or exceed the threshold as predicted. As a result, wasteful migration of the virtual machine in accordance with a load prediction may be suppressed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing a program that causes a processor in a first computer to execute a procedure, the procedure comprising:
   turning, when the processor detects a first trigger event, a migration preparation flag ON which indicates that migration preparation for a virtual machine is underway, and starting to copy data of the virtual machine running on the first computer to a second computer;
   monitoring an index value related to conditions of running the virtual machine on the second computer;
   terminating the virtual machine when the processor detects that the index value falls below a threshold:
   copying a portion of data of the virtual machine which is updated after a previous copy;
   instructing the second computer to start the virtual machine;
   turning the migration preparation flag OFF when the processor detects a second trigger event; and
   instructing the second computer to cancel the migration preparation.

2. The non-transitory computer-readable recording medium according to claim 1, wherein
   the index value is a value that indicates a remaining amount of electrical power of a power source device that supplies electrical power to the first computer.

3. A method for controlling a virtual machine, the method comprising:
   turning by a first computer, when the first computer detects a first trigger event, a migration preparation flag ON which indicates that migration preparation for a virtual machine is underway, and starting to copy data of the virtual machine running on the first computer to a second computer;
   monitoring an index value related to conditions of running the virtual machine on the second computer;

terminating the virtual machine when the first computer detects that the index value falls below a threshold;
copying a portion of data of the virtual machine which is updated after a previous copy;
instructing the second computer to start the virtual machine:
turning the migration preparation flag OFF when the first computer detects a second trigger event; and
instructing the second computer to cancel the migration preparation.

4. An information processing apparatus comprising:
a processor configured to
 turn, upon detecting a first trigger event, a migration preparation flag ON which indicates that migration preparation for a virtual machine is underway,
 start, upon turning the migration preparation flag ON, to copy data of the virtual machine running on the information processing apparatus from the information processing apparatus to a computer,
 monitor an index value related to conditions of running the virtual machine on the computer,
 terminate the virtual machine upon detecting that the index value falls below a threshold,
 copy, upon terminating the virtual machine, a portion of data of the virtual machine which is updated after a previous copy,
 instruct, upon copying the portion, the computer to start the virtual machine,
 turn the migration preparation flag OFF upon detecting a second trigger event, and
 instruct, upon turning the migration preparation flag OFF, the computer to cancel the migration preparation.

5. An information processing system comprising:
a management apparatus;
a first information processing apparatus; and
a second information processing apparatus including a processor configured to
 turn upon detecting a first trigger event, a migration preparation flag ON which indicates that migration preparation for a virtual machine is underway,
 start, in response to a request from the management apparatus, to copy data of the virtual machine running on the second information processing apparatus from the second information processing apparatus to the first information processing apparatus,
 monitor an index value related to conditions of running the virtual machine on the first information processing apparatus,
 terminate the virtual machine upon detecting that the index value falls below a threshold,
 copy, upon terminating the virtual machine, a portion of data of the virtual machine which is updated after a previous copy,
 instruct, upon copying the portion, the first information processing apparatus to start the virtual machine,
 turn the migration preparation flag OFF upon detecting a second trigger event, and
 instruct, upon turning the migration preparation flag OFF, the first information processing apparatus to cancel the migration preparation.

* * * * *